Figure 1:
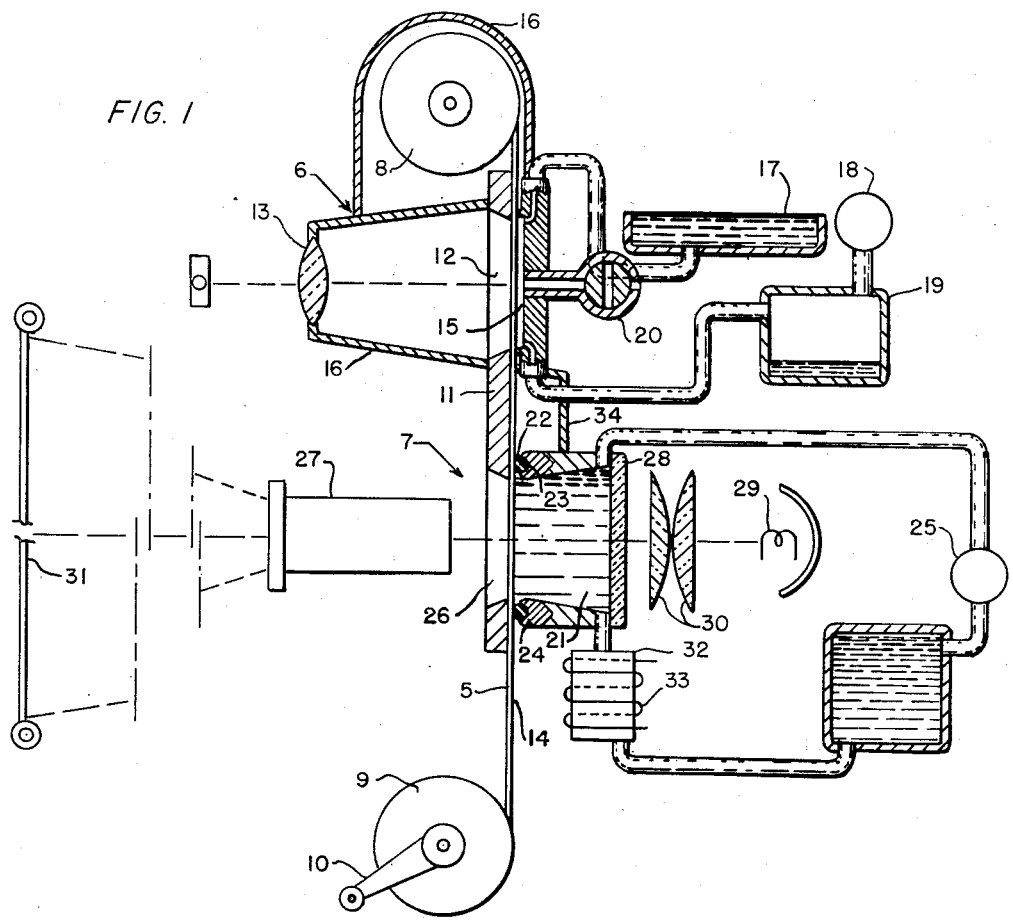

Oct. 21, 1958        C. ORLANDO        2,856,829
APPARATUS FOR MAKING PHOTOGRAPHIC
REPRODUCTIONS FOR PROJECTION
Filed Dec. 7, 1955

INVENTOR,
CARL ORLANDO.
BY
Harry M. Saragovitz
ATTORNEY

United States Patent Office 2,856,829
Patented Oct. 21, 1958

2,856,829

APPARATUS FOR MAKING PHOTOGRAPHIC REPRODUCTIONS FOR PROJECTION

Carl Orlando, Long Branch, N. J., assignor to the United States of America as represented by the Secretary of the Army Application December 7, 1955, Serial No. 551,712

6 Claims. (Cl. 95—14)

(Granted under Title 35, U. S. Code (1952), sec. 266)

The invention described herein may be manufactured and used by or for the Government for governmental purposes without the payment of any royalty thereon.

This invention relates to the rapid processing of photographic film to permit projection of high quality pictures a short time interval after the picture is recorded on the sensitive film.

The invention is useful in many applications wherein it is necessary to see and study the subject as quickly as possible after it has been recorded by a camera and particularly where it is required that the subject be studied by a group of observers.

An effective application of the invention is to facilitate the examination of data presented upon the face of a cathode-ray tube. In this application a photographic image is impressed upon photographic film and immediately developed and fixed by rapid processing techniques. In the present invention the arrangement of the processing elements and the order in which they act upon the film greatly reduces the total processing time period. A particularly effective phase of the invention is that relating to a transparent fixing chamber physically separated from a developing chamber. In this fixing chamber stopping of the development of the image and clearing the film takes place while an intense white source of light is directed upon the film, the path of the light being thru the fixing chamber, the film and the projecting lens. It will be noted by employing the above techniques a greatly enlarged picture may be projected upon a screen with great clarity and fine resolution of detail. The projecting light has no degrading effect upon the image quality since the developing action is instantly stopped when the film is transferred from the developing bath into the fixing bath. Throughout the above cycle of operations the film is held at the focal distance of the taking lens when the picture is recorded and at the focal distance of the projecting lens when the processed image is projected on the screen.

It is a primary object of the invention to provide an apparatus which will photograph an object or event and project the recorded picture thereof upon a large area screen within a very short period of time which may be as short as two-tenths of a second.

A further object of the invention is to provide an apparatus for rapidly processing and projecting a photographic image wherein its latent image is first developed then quickly transported to a high energy fixing bath wherein an intense projection light is applied thereto to effect its immediate projection upon the screen.

A further object of the invention is to provide an apparatus for rapid processing and projection of a photographic image wherein the sensitive medium is held in a first position for exposure and development and subsequently is moved rapidly to another stationary position at which point its development is stopped and fixing and clearing are completed thus enabling a beam of projecting light to project the image upon a screen.

A further object of the invention is to provide a rapid processing apparatus wherein a picture is taken and the sensitive medium is processed to present a high degree of clarity with full density scale for brilliant projection within a minimum time period.

Other objects and features of the invention will more fully appear from the following description and will be particularly pointed out in the claims.

Figure 2:
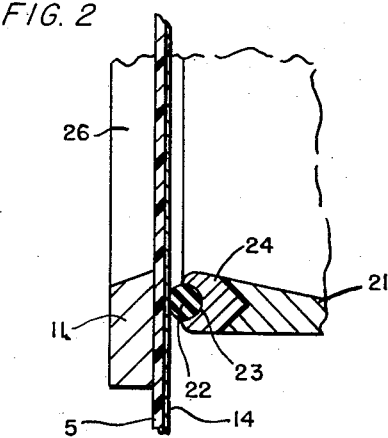

To provide a better understanding of the invention a particular embodiment thereof will be described and illustrated in the accompanying drawing wherein Fig. 1 is a partial diagrammatic general view of the apparatus and Fig. 2 is a detail view of a portion of the apparatus at enlarged scale.

The apparatus embodying the invention may be divided into two main sections for descriptive purposes, a picture taking section and picture projecting section, the two sections, desirably, being spaced as closely as possible. The sensitive material for use in such an apparatus, desirably, is in the form of a film strip which may readily be threaded thru the apparatus and rapidly fed from one of the above-mentioned main sections to the other.

The drawing is mainly diagrammatic and shows one possible arrangement of the various elements of the apparatus. Other arrangements of the elements may be made within the scope of the appended claims. In the apparatus shown a film strip 5 is arranged to be fed step by step from the picture taking station 6 to the projection station 7. The movement of the film may be accomplished in any suitable manner such as by a conventional film advancing mechanism or a specialized rapid action film transport device. As illustrated in the drawing the unexposed film is stored upon a reel 8 and is drawn thru the apparatus by rotating a second reel 9 provided with a crank 10 or other suitable operating means.

Desirably, the film is held in a flat plane by a pressure plate 11 which may be common to both stations 6 and 7 and is acted upon by spring pressure means of any suitable construction which acts to maintain the film in a flat plane and at a fixed focal distance from its co-acting lenses.

The pressure plate 11 has an aperture 12 therein which admits light from a taking lens 13 to the film 5 which in turn is disposed with its emulsion 14 away from the lens and since the film is provided with a transparent base, exposure of the emulsion is effected thru the base. The coated face of the film is pressed against the open side of a developing chamber 15 thru which high energy developing solution is forced during the developing operation. All light except that entering thru the lens is shielded from the film during the taking and developing steps of the complete cycle. Shielding of the light may be effected in any suitable manner such as by the housing 16.

The developing chamber may be of any suitable construction presenting an opening in its wall at least as large as the area of a film frame. Desirably, the chamber is very narrow in the plane of the film, its back wall being only a few one-thousandths of an inch away from the film 5. The film is pressed by the pressure plate 11 against the edges of the chamber opening, the edges of which are desirably provided with narrow raised ribs to engage the film and provide a liquid tight union between the film and the developing chamber.

The developer may be introduced in any suitable manner. Desirably, however, the developer is of the high energy fast acting type and is introduced at the upper end of the chamber thru a tube connected to a supply tank 17. The developer is caused to flow rapidly along the emulsion in any suitable manner as by means of a suction pump 18 indirectly connected to an outlet at the bottom edge of the chamber. The used developer flows thru a tube connecting the bottom of the chamber 15 and a relatively large container 19 providing a space to receive the liquid and an air space above the used liquid to which a pump 18 is connected. Thus a thin film of fresh developer is drawn across the film while the partial vacuum created by the pump acts also to prevent seepage of developer at the contact point between the film and the developing chamber. Valve means 20 is provided to break the vacuum when the valve is opened to the atmosphere. This valve is used to control the developing period since no developer will flow when the vacuum ceases to function. To insure proper operation the level of the liquid in the container 17 should be below the top of the chamber 15. The valve means 20 is desirable also since its operation accomplishes another function; namely, that of removing the residual developing solution in the chamber 15. When the valve has been opened a flow of air takes place from the outer atmosphere thru the chamber and into the container 19, such flow of air carrying the developing liquid from the chamber 15. Any suitable means may, however, be used to supply the chamber with developing fluid and to remove it therefrom.

By employing a special type of emulsion which is resistant to heat and a high energy developer used at high temperature complete development of the film will result in a time period as short as fifteen one-hundredths of a second without sacrificing the quality obtainable in a normal developing operation.

At the end of the developing period the film is fed to the projection station 7. At this station a fixing chamber 21 is provided which contains a heated hypo solution. The chamber 21 desirably is spaced as closely as possible to the developing chamber 15 which shortens the travel of the film between successive exposure frames. The side of the chamber 21 adjacent to the film is open to permit the hypo solution to act upon the film. A suitable sealing means is provided to prevent escape of the liquid at the areas of contact between the edges of the chamber and the film. This seal may be in the form of a gasket 22 of non-abrasive material. A suitable material has been found to be a rubber compound having a slightly yielding characteristic. The gasket extends around the edges of the chamber opening to encompass the film frame and may be of round cross-sectional contour and be received in a groove 23 in the walls of the chamber. To facilitate interchanging gaskets, which may become worn, the fixing chamber is provided with a removable ring section 24 having a liquid-tight connection with the chamber walls.

The hot fixing solution may be fed to the chamber 21 in any suitable manner such as by a pumping device 25 so designed that the pressure within the chamber 21 will always be slightly less than atmospheric pressure. In this manner, seepage of solution between the gasket and the film is prevented.

The pressure plate 11 is provided with a gate opening 26 thru which projecting light may reach the projecting lens 27. The back wall 28 of the chamber 21 is transparent and may desirably be made of glass. Since the hypo solution is clear, an unobstructed light path is provided extending from outside the chamber thru the film and to the projecting lens 27. Light for projection purposes may be supplied in any suitable manner. As shown, a projection lamp 29 and a pair of condensing lenses 30 provide a powerful beam of light to illuminate the film, the image from which is projected upon the screen 31 by the lens 27.

To maintain the high temperature of the hypo solution while it is circulated thru the chamber 21 the liquid is passed thru a heating element 32 having a heat exchange means and a source of heat such as an electric heating coil 33.

For best operation the top and bottom walls of the chamber 21 may be tapered in thickness to provide sloping inner surfaces which diverge in a direction away from the film opening. This special conformation of the chamber facilitates removal of the hypo solution from the chamber when, for example, operation of the apparatus is to be discontinued or the film is to be changed. When so doing the chamber 21 must be drained of solution to prevent the spilling thereof. By maintaining the level of the supply of hypo below the level of the fixing chamber, when the pump 25 is stopped the contents of the chamber will drain therefrom and moreover the sloping bottom wall of the chamber drains substantially all of the liquid away from the open wall which prevents spilling the liquid when the film is removed. In addition, the upwardly sloping upper wall helps to prevent the accumulation of air bubbles in the chamber when the film is replaced and operation of the device is resumed.

To more clearly present the advantages of the invention a detail account of its operation will now be set forth. The film is first set in place by threading it thru the taking and projecting stations with its emulsion side 14 toward the developing chambers and thence to the film take-up reel 9. With the film in stationary position the image of the subject formed by the lens 13 is impressed upon the film 5. This exposure may be accomplished by means of a suitable shutter or when the device is used to record the trace of a radar scope, the lens is maintained open during a period which may be the duration of a 360° traverse of a radar beam or under special circumstances the lens may be open thruout the operation of the apparatus. The pump 18 which has been started floods the film with developer which immediately develops the trace which is moving on the face of the radar scope after which the developer solution is removed from the chamber 15 in the manner described above. The film is then immediately transported to the projecting station where development of the film, upon contact with the hot hypo solution in the chamber 21, is instantly stopped and in a very short time period thereafter which may be of the order of .15 second the picture is cleared. To protect the film during its transport from one position to the other a light barrier 34 is provided between the processing chambers. Since the projection light source 29 is turned on thruout the period of operation of the apparatus the picture appears upon the screen within a minimum time period with maximum clarity and with fine resolution of detail. Moreover, during the operation of the device the pump 25 maintains a supply of hot hypo flowing thru the chamber 21. The next exposure may now be made upon an unexposed area of the strip moved into position by the transport of the film, after which the complete cycle is repeated. In the case of a 360° scanning radar scope, a complete cycle is repeated during each revolution of the beam.

The apparatus of the invention is capable of photographing an object or event and projecting a greatly enlarged picture thereof upon a screen in a period of time as short as two-tenths of a second after the exposure has been completed and moreover the picture thus displayed is a fully developed and fixed-out silver image in which no sacrifice of quality due to the rapid processing has taken place. Prior attempts to accomplish this result have failed because the processing cycle used heretofore subjected the film to projection illumination before its sensitivity had been neutralized and development stopped by a fixing bath. Under these conditions the film becomes fogged and its density scale is shifted into a range where satisfactory projection is not possible. Moreover, in most of the prior devices the projection of the picture is made thru the film before the unexposed emulsion has been removed. Without removal of the unexposed emulsion excess diffusion is encountered which produces a picture lacking in contrast and fineness of detail.

As above pointed out, the practice of the invention overcomes the deficiencies of prior devices and in addition reduces the total time period between making the exposure and projecting the finished picture.

What is claimed is:

1. Apparatus for rapid photographic reproduction and projection comprising a taking lens, a sensitive film, a light-tight housing for protecting the film until development is completed, means to hold said film at the focal plane of said lens within said housing, means operable at said focal plane for developing said film, a fixing chamber closely adjacent to said developing means, said fixing chamber being transparent and containing fixing solution, a projection lens, means to hold said film in the focal plane of said projection lens and within said fixing chamber, means to transport the exposed film from its taking and developing position into its projecting position and a projecting light source directing its beam thru said fixing chamber, film and lens.

2. Apparatus for rapid photographic reproduction and projection comprising a taking lens, a film having a transparent base and a light sensitive emulsion coated on one side thereof, a light-tight housing for protecting the film until development is completed, a developing chamber within said housing having one of its sides open and directed toward said taking lens, said open side being positioned at the focal plane of said lens, means to continuously hold said film with its emulsion side in liquid-tight contact with the open side of said developing chamber, a fixing chamber closely adjacent to said developing chamber, said fixing chamber being transparent and acting to hold fixing solution, a projection lens, means to hold film strip at the focal distance of said projection lens and within said fixing chamber, means to move the exposed and developed film from its taking and developing position to its fixing position immersed in said fixing solution and a projecting light source directed thru said fixing chamber, film and projecting lens.

3. Apparatus for rapid photographic reproduction and projection comprising a taking lens, a photo-sensitive film situated at the focal plane of said lens, a light-tight housing for protecting the film until its development is complete, a developing chamber within said housing having an open side situated at the focal plane of said lens, means to hold the film in liquid-tight contact with the edges of said open side, means to supply high energy developer to said developing chamber, a projection lens, a fixing chamber closely adjacent to said developing chamber and containing a fixing bath, said fixing chamber having an open side situated in the focal plane of said projection lens, means to move the exposed and developed film to the open side of said fixing chamber, means to hold the film in tight contact with the edges of said open side thus subjecting the film to the fixing action of said fixing bath, a transparent window in said fixing chamber and a light source arranged with respect to the fixing chamber to project its light thru said chamber, film and projection lens.

4. Apparatus for rapid photographic reproduction and projection comprising a sensitive film, a taking lens focused on said film, a light-tight developing chamber having an open side facing said film, a pressure plate continuously holding said film against the open side of said developing chamber whereby an image impressed upon the film by said taking lens is immediately developed, a fixing chamber adjacent said developing chamber, said fixing chamber having an open side, a pressure plate to continuously guide and hold said film in close contact with the edges of said open side, means to feed the film from said developing to said fixing chambers, a transparent wall in said fixing chamber, a gate opening in said pressure plate to permit light to traverse the film, a light source whose output lies at least partly within the visible spectrum arranged to project its beam thru said fixing chamber and film, a projection lens positioned to project the processed and illuminated picture upon a screen and means to feed hot hypo solution to said fixing chamber.

5. A method of rapid photographic recording and projection comprising recording a subject on a film while at a first position, developing the film at that position with high energy developer, then immediately moving the developed film to a second position at the focal plane of a projecting lens, said second movement acting to immerse the film in a film development stopping and fixing bath and immediately thereafter projecting the picture while the film is at said second position.

6. A method for rapid photographic recording and projection comprising positioning a sensitive film in a first position at the focal plane of a taking lens, exposing the film thru said lens, developing the film in darkness in high energy developer while the film is at said first position, then immediately moving the light protected film to a closely adjacent second position in the focal plane of a projection lens, such movement acting to immerse the film in a hot fixing bath and immediately directing a beam of light from a projection lamp through a projection lens, the film and the fixing solution while the film is in said second position.

References Cited in the file of this patent

UNITED STATES PATENTS

| | | |
|---|---|---|
| 2,166,247 | Hartley | July 18, 1939 |
| 2,221,055 | Lundegardh | Nov. 12, 1940 |
| 2,446,668 | Tuttle | Aug. 10, 1948 |
| 2,665,619 | Tuttle | Jan. 12, 1954 |
| 2,688,278 | Tuttle | Sept. 7, 1954 |